US010738513B2

(12) United States Patent
Soonthornwinate et al.

(10) Patent No.: US 10,738,513 B2
(45) Date of Patent: *Aug. 11, 2020

(54) FLUSH POWER SLIDE DOOR HANDLE

(71) Applicant: Toyota Motor Engineering & Manufacturing North America, Inc., Erlanger, KY (US)

(72) Inventors: Tarakorn Soonthornwinate, Ann Arbor, MI (US); Yoshiki Ishikawa, Ann Arbor, MI (US); Frank A. Richards, Michigan Center, MI (US); Takahiro Iwama, Yatomi (JP); Hideto Suzuki, New Hudson, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 435 days.

This patent is subject to a terminal disclaimer.

(21) Appl. No.: 15/627,830

(22) Filed: Jun. 20, 2017

(65) Prior Publication Data

US 2018/0163442 A1 Jun. 14, 2018

Related U.S. Application Data

(60) Provisional application No. 62/431,996, filed on Dec. 9, 2016.

(51) Int. Cl.
 *E05B 85/10* (2014.01)
 *E05B 77/12* (2014.01)
 (Continued)

(52) U.S. Cl.
 CPC .............. *E05B 85/10* (2013.01); *E05B 77/04* (2013.01); *E05B 77/06* (2013.01); *E05B 77/12* (2013.01);
 (Continued)

(58) Field of Classification Search
 CPC ....... Y10T 292/57; E05B 85/10; E05B 77/04; E05B 77/06; E05B 79/06; E05B 79/16;
 (Continued)

(56) References Cited

U.S. PATENT DOCUMENTS

| 137,211 | A | * | 3/1873 | Jones | E05C 1/10 |
|---|---|---|---|---|---|
| | | | | | 292/175 |
| 967,377 | A | * | 8/1910 | Henry | E05C 1/06 |
| | | | | | 292/142 |

(Continued)

FOREIGN PATENT DOCUMENTS

| CN | 108193960 A | 6/2018 |
|---|---|---|
| DE | 3444898 C1 | 3/1986 |

(Continued)

*Primary Examiner* — Kristina R Fulton
*Assistant Examiner* — Faria F Ahmad
(74) *Attorney, Agent, or Firm* — Christopher G. Darrow; Darrow Mustafa PC

(57) ABSTRACT

A flush mounted handle assembly for a vehicle is provided, operable with both power and manual modes of opening and closing a slide door. The flush mounted handle assembly may include a case configured to be fixed in a recess of a power slide door of a vehicle. A dual-directional handle base may be provided, pivotally coupled to the case. The handle base may have a first end and a second opposing end. The first and seconds ends may be configured for a selective pivotal movement in opposite directions about a pivot axis. A bell crank may be provided, coupled to the case, and configured to rotate upon engagement with the handle base in order to actuate a switch assembly and to coordinate different operations of the power slide door.

16 Claims, 13 Drawing Sheets

(51) Int. Cl.
| | |
|---|---|
| *E05B 81/76* | (2014.01) |
| *E05F 15/79* | (2015.01) |
| *E05B 77/04* | (2014.01) |
| *E05B 83/40* | (2014.01) |
| *E05B 79/06* | (2014.01) |
| *E05B 79/16* | (2014.01) |
| *E05B 77/06* | (2014.01) |
| *E05B 1/00* | (2006.01) |
| *B60J 5/06* | (2006.01) |

(52) U.S. Cl.
CPC .............. *E05B 79/06* (2013.01); *E05B 79/16* (2013.01); *E05B 81/76* (2013.01); *E05B 83/40* (2013.01); *E05B 85/103* (2013.01); *E05F 15/79* (2015.01); *B60J 5/06* (2013.01); *E05B 2001/0076* (2013.01); *Y10S 292/31* (2013.01); *Y10T 292/57* (2015.04)

(58) Field of Classification Search
CPC ........ E05B 83/40; E05B 85/103; E05B 81/76; E05B 77/12; E05B 2001/0076; E05B 85/00; E05B 77/14; E05B 85/16; E05B 79/22; E05B 85/14; E05F 15/79; B60J 5/06; Y10S 292/31
See application file for complete search history.

(56) References Cited

U.S. PATENT DOCUMENTS

| | | | | |
|---|---|---|---|---|
| 1,866,299 A * | 7/1932 | Ericson | ........................ | 244/129.4 |
| 2,029,199 A * | 1/1936 | Segar | ..................... | E05B 85/107 |
| | | | | 292/173 |
| 2,246,708 A | 6/1941 | Wieben | | |
| 2,649,322 A * | 8/1953 | Grant | ....................... | E05C 1/145 |
| | | | | 292/173 |
| 2,749,167 A * | 6/1956 | Love | ........................ | E05C 3/122 |
| | | | | 292/226 |
| 2,772,809 A * | 12/1956 | Ross | .................. | B60K 15/0406 |
| | | | | 220/318 |
| 2,784,993 A * | 3/1957 | Collar | ...................... | E05B 57/00 |
| | | | | 292/223 |
| 3,046,043 A * | 7/1962 | Matteson | .................. | E05C 1/10 |
| | | | | 292/175 |
| 3,153,552 A * | 10/1964 | Sandor | .................... | E05B 85/14 |
| | | | | 292/336.3 |
| 3,153,553 A * | 10/1964 | Sandor | .................... | E05B 85/14 |
| | | | | 292/336.3 |
| 3,214,207 A * | 10/1965 | Swanson | ............... | E05C 19/145 |
| | | | | 292/66 |
| 3,249,379 A | 5/1966 | Ross | | |
| 3,266,275 A * | 8/1966 | Atkinson | ............ | E05B 65/5269 |
| | | | | 70/70 |
| 3,266,830 A * | 8/1966 | Appleberry | ............... | E05C 3/14 |
| | | | | 292/128 |
| 3,590,609 A * | 7/1971 | Atkinson | ............. | E05B 65/5269 |
| | | | | 70/70 |
| 3,936,082 A * | 2/1976 | Swanson | ................. | E05C 19/14 |
| | | | | 292/113 |
| 3,993,338 A * | 11/1976 | Cherbourg | .................. | B60J 5/06 |
| | | | | 292/336.3 |
| 3,993,339 A * | 11/1976 | Cherbourg | .................. | E05B 5/00 |
| | | | | 292/336.3 |
| 4,487,440 A * | 12/1984 | Beijer | .................... | B64C 1/1407 |
| | | | | 292/336.3 |
| 4,530,184 A * | 7/1985 | Chikaraishi | ............. | B60J 5/062 |
| | | | | 188/36 |
| 4,551,998 A * | 11/1985 | Ricouard | ........... | E05B 65/5269 |
| | | | | 292/210 |
| 4,580,821 A | 4/1986 | Genord, Jr. et al. | | |
| 4,588,219 A * | 5/1986 | Kobayashi | ............... | E05B 85/18 |
| | | | | 292/336.3 |
| 4,907,833 A * | 3/1990 | Ogasawara | ............. | E05B 85/18 |
| | | | | 292/336.3 |
| 5,058,937 A | 10/1991 | Miehe et al. | | |
| 5,234,237 A * | 8/1993 | Gergoe | .................... | E05B 83/40 |
| | | | | 292/201 |
| 5,301,989 A * | 4/1994 | Dallmann | ........... | E05B 65/0876 |
| | | | | 292/142 |
| 5,605,363 A * | 2/1997 | Kapes | .................... | E05B 77/265 |
| | | | | 292/196 |
| 5,979,949 A * | 11/1999 | Finkelstein | ......... | E05B 65/0811 |
| | | | | 292/113 |
| 6,036,244 A * | 3/2000 | Tyves | ...................... | E05B 85/12 |
| | | | | 292/336.3 |
| 6,174,007 B1 * | 1/2001 | Schlack | .................... | E05B 5/00 |
| | | | | 292/336.3 |
| 6,247,343 B1 | 6/2001 | Weiss et al. | | |
| 6,490,895 B1 | 12/2002 | Weinerman et al. | | |
| 6,547,290 B1 | 4/2003 | Zenner et al. | | |
| 6,561,557 B2 * | 5/2003 | Choi | ....................... | E05B 83/40 |
| | | | | 292/216 |
| 6,565,134 B1 | 5/2003 | Stuart et al. | | |
| 6,616,202 B2 * | 9/2003 | Choi | ....................... | E05B 85/12 |
| | | | | 292/336.3 |
| 6,651,387 B2 * | 11/2003 | Choi | ....................... | E05B 83/40 |
| | | | | 292/341.16 |
| 6,668,602 B2 * | 12/2003 | Graham | ................ | E05B 1/0092 |
| | | | | 292/336.3 |
| 6,758,503 B2 * | 7/2004 | Sadler | ....................... | E05B 5/00 |
| | | | | 292/35 |
| 6,779,681 B2 * | 8/2004 | Doerfler | ................. | A45C 13/12 |
| | | | | 206/1.5 |
| 6,923,481 B2 * | 8/2005 | Bruderick | ............... | E05B 81/76 |
| | | | | 16/361 |
| 7,062,818 B2 * | 6/2006 | Jeffries | ................. | E05B 1/0092 |
| | | | | 16/419 |
| D543,437 S * | 5/2007 | Mallory | ........................ | D8/330 |
| 7,320,478 B2 | 1/2008 | Gaboury et al. | | |
| 7,341,291 B2 | 3/2008 | Ooe et al. | | |
| 7,360,802 B2 * | 4/2008 | Schlack | ................ | E05B 1/0092 |
| | | | | 292/336.3 |
| 7,398,664 B1 * | 7/2008 | Weinerman | ........... | E05B 1/0092 |
| | | | | 292/207 |
| 7,401,484 B1 * | 7/2008 | Holmes | .................... | E05B 13/10 |
| | | | | 292/336.3 |
| 7,452,010 B2 * | 11/2008 | Cotton | ................. | E05B 1/0092 |
| | | | | 292/100 |
| 7,454,933 B1 * | 11/2008 | Paige | .................... | E05B 1/0092 |
| | | | | 292/207 |
| 7,621,573 B2 | 2/2009 | Thomas et al. | | |
| 7,552,954 B2 * | 6/2009 | Rozo | ......................... | E05B 5/00 |
| | | | | 292/143 |
| D595,562 S * | 7/2009 | Jones | .......................... | D8/331 |
| 7,707,863 B2 * | 5/2010 | Tsuchikiri | ............... | B60R 25/04 |
| | | | | 70/252 |
| 7,752,877 B2 * | 7/2010 | Burns | ....................... | E05B 5/00 |
| | | | | 292/336.3 |
| 7,931,312 B2 * | 4/2011 | Mochizuki | ............... | E05B 81/06 |
| | | | | 292/216 |
| 8,291,732 B2 * | 10/2012 | Ramsauer | ............ | E05B 1/0092 |
| | | | | 292/32 |
| 8,322,077 B2 | 12/2012 | Papanikolaou et al. | | |
| 8,516,862 B2 * | 8/2013 | Stuckey | ............... | E05B 47/0603 |
| | | | | 292/336.3 |
| 8,544,904 B2 * | 10/2013 | Kindig | .................. | E05B 85/103 |
| | | | | 292/336.3 |
| 8,579,337 B2 | 11/2013 | Hidding et al. | | |
| 8,701,353 B2 | 4/2014 | Patel et al. | | |
| 8,873,742 B1 | 10/2014 | Owens et al. | | |
| 8,985,648 B2 * | 3/2015 | Muller | .................... | E05B 85/107 |
| | | | | 292/336.3 |
| 9,151,089 B2 | 10/2015 | Aerts et al. | | |
| 9,181,733 B2 | 11/2015 | Fujiwara et al. | | |
| 9,249,608 B2 | 2/2016 | Lang et al. | | |
| 9,316,020 B2 * | 4/2016 | Lee | ........................ | E05B 1/003 |
| 9,505,365 B1 | 11/2016 | Van Wiemeersch | | |
| 9,816,299 B2 * | 11/2017 | Pickar | ..................... | E05C 1/145 |
| 10,047,549 B2 * | 8/2018 | Grant | ....................... | E05B 41/00 |

(56) References Cited

U.S. PATENT DOCUMENTS

| | | | |
|---|---|---|---|
| 2003/0033690 A1 | 2/2003 | Lin | |
| 2003/0121299 A1* | 7/2003 | Graham | E05B 1/0092 70/208 |
| 2007/0199760 A1 | 8/2007 | Kamiya | |
| 2007/0200366 A1* | 8/2007 | Rozo | E05B 5/00 292/336.3 |
| 2007/0240463 A1* | 10/2007 | Antonucci | E05B 1/0092 70/208 |
| 2009/0108594 A1 | 4/2009 | Shinoda et al. | |
| 2010/0001136 A1* | 1/2010 | Wilson | B64C 1/1415 244/129.5 |
| 2010/0018268 A1* | 1/2010 | Parker | E05B 65/1066 70/489 |
| 2010/0088855 A1 | 4/2010 | Ruse et al. | |
| 2010/0107803 A1* | 5/2010 | Ramsauer | E05B 1/0092 74/510 |
| 2011/0012378 A1 | 1/2011 | Ueno et al. | |
| 2011/0120022 A1 | 5/2011 | Papanikolaou et al. | |
| 2011/0148575 A1* | 6/2011 | Sobecki | E05B 85/103 340/5.64 |
| 2011/0156411 A1* | 6/2011 | Commons | E05B 1/0092 292/336.3 |
| 2011/0179602 A1 | 7/2011 | Fujiwara et al. | |
| 2011/0258935 A1 | 10/2011 | Heller | |
| 2012/0181800 A1 | 7/2012 | Jankowski et al. | |
| 2013/0241215 A1 | 9/2013 | Halliwell et al. | |
| 2014/0015261 A1 | 1/2014 | Burns et al. | |
| 2014/0049058 A1 | 2/2014 | Kudoh et al. | |
| 2014/0260458 A1* | 9/2014 | Lee | E05B 7/00 70/344 |
| 2014/0265372 A1 | 9/2014 | Smart | |
| 2014/0327252 A1 | 11/2014 | Sobecki et al. | |
| 2015/0035299 A1 | 2/2015 | Corwin et al. | |
| 2015/0076843 A1 | 3/2015 | Kindig | |
| 2015/0084354 A1* | 3/2015 | Lee | E05B 1/003 292/336.3 |
| 2015/0130197 A1* | 5/2015 | Eller | E05B 1/00 292/336.3 |
| 2015/0233153 A1 | 8/2015 | Smart et al. | |
| 2015/0233154 A1 | 8/2015 | Smart et al. | |
| 2015/0283886 A1 | 10/2015 | Nania | |
| 2015/0315812 A1* | 11/2015 | Vasi | E05B 5/006 292/336.3 |
| 2016/0163133 A1 | 6/2016 | Ricci | |
| 2016/0290019 A1 | 10/2016 | Nagata et al. | |
| 2017/0041816 A1 | 2/2017 | Cho et al. | |
| 2017/0066312 A1* | 3/2017 | Coutier | B60J 9/00 |
| 2017/0089102 A1* | 3/2017 | Yoshino | E05B 77/32 |
| 2018/0148957 A1* | 5/2018 | Och | E05B 81/76 |
| 2019/0249471 A1* | 8/2019 | Patel | E05B 79/06 |

FOREIGN PATENT DOCUMENTS

| | | | |
|---|---|---|---|
| DE | 19833168 A1 | 2/2000 | |
| EP | 289715 A1 | 2/1988 | |
| FR | 2876811 A1 * | 4/2006 | E05B 85/18 |
| FR | 2876811 A1 | 4/2006 | |

\* cited by examiner

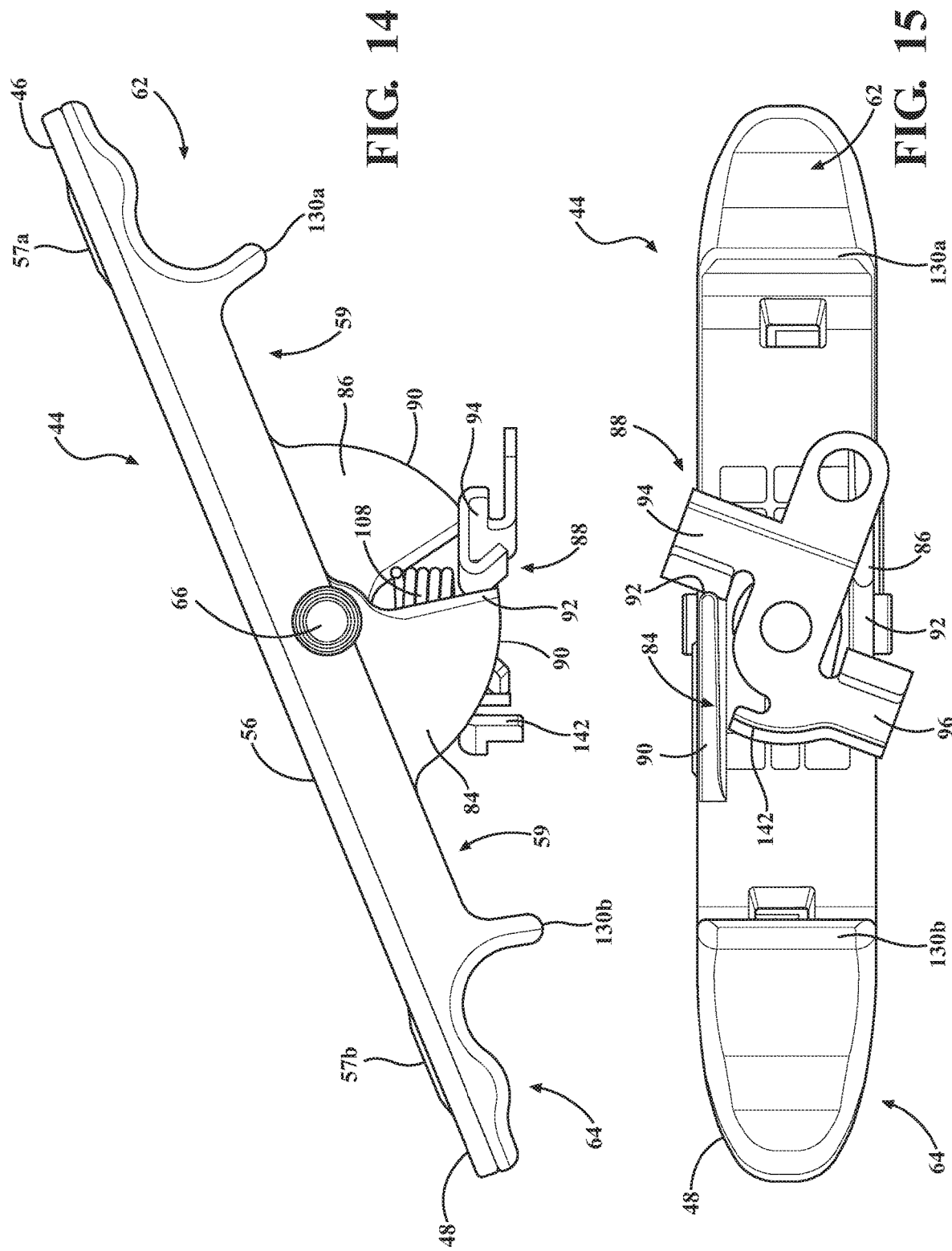

FLUSH POWER SLIDE DOOR HANDLE

CROSS-REFERENCE TO RELATED APPLICATION

This application claims the benefit of U.S. Provisional Application No. 62/431,996, filed Dec. 9, 2016, which is incorporated by reference in its entirety.

TECHNICAL FIELD

The present disclosure relates generally to a flush handle for a door or other closure and, more particularly, to a pivoting handle configured to open a sliding door of a vehicle in both a power mode and a manual mode.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Minivan-type vehicles commonly have a pair of pivoting front occupant doors and at least one rear occupant sliding door. In various instances, users may approach a vehicle with their hands occupied, for example, carrying groceries or carrying a young child. Manual "grip" type handles commonly used with most vehicles are not necessarily operable without a relatively strong grip and pull, which may be difficult if one's hands are not otherwise free. Thus, it would be desirable to have a door handle that is easy to operate with a gentle push or depression of one or two fingers.

Prior powered slide doors that operate via a remote control or push button disposed in the interior of the vehicle are only operable when connected to a power supply. Accordingly, there remains a need for an improved handle assembly that provides an appealing design, yet is functional in emergency situations or other instances when there may not be a power supply readily available for use.

SUMMARY

This section provides a general summary of the disclosure, and is not a comprehensive disclosure of its full scope or all of its features.

In various aspects, the present disclosure provides a flush mounted handle assembly for a vehicle, operable in power and manual modes. The flush mounted handle assembly may include a case configured to be fixed in a recess of a power slide door of a vehicle. A dual-directional handle base may be provided, pivotally coupled to the case. The handle base may have a first end and a second opposing end. The first and seconds ends may be configured for a selective pivotal movement in opposite directions about a pivot axis. A bell crank may be provided, coupled to the case, and configured to rotate upon engagement with the handle base in order to actuate a switch assembly and to coordinate different operations of the power slide door.

In other aspects, the present disclosure provides a handle assembly for a vehicle. The handle assembly may include a case configured to be fixed to a power slide door of the vehicle. A self-centering bell crank may be coupled to the case in a biased arrangement, and configured to rotate in a first direction to selectively engage power mode and manual mode operations of the slide door, and to return rotate in a second, opposite direction to a centered rest position. A pivoting handle may be provided, configured to rotate the bell crank. The handle may include a handle base movable about a fixed pivot axis extending through a center the case. The handle base may define first and second drive arms. The first and second drive arms may be configured to rotatably engage the bell crank when respective first and second opposing ends of the handle base are inwardly depressed.

In still other aspects, the present disclosure provides a method for operating a handle assembly of a power slide door of a vehicle. The method may include depressing a first end of a pivoting handle inward a first distance into the handle assembly, thereby causing a drive arm extending from the handle to rotate a bell crank. Upon rotation of the bell crank, an arm of the bell crank may, in turn, actuate a switch sub-assembly configured to automatically engage either an opening or closing movement of the power slide door. The method may include releasing the end of the handle, and permitting the bell crank and the handle base to automatically return to a biased centered position. In such a position, an exterior portion of the handle assembly may be flush with an exterior panel of the power slide door. The method may additionally include determining a source of power from a power supply has been interrupted, where actuating the switch sub-assembly does not automatically engage either an opening or closing movement of a power slide door. The method may then include further depressing the end of the pivoting handle a second distance into the handle assembly, to cause additional rotation of the bell crank and to both (1) release a lock mechanism and (2) cause a second, opposite end of the pivoting handle to outwardly extend a further distance from the door. The method may include gripping the second end of the handle to manually move the power slide door to an open or closed position.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the following description and the accompanying drawings, wherein:

FIG. 14 is a top plan view illustrating an exemplary handle base and bell crank in a first, fully depressed, actuated state;

FIG. 15 is a rear plan view illustrating the exemplary handle base and bell crank in the first actuated state, as shown in FIG. 14;

It should be noted that the figures set forth herein are intended to exemplify the general characteristics of the devices and methods among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to a mini-van slide door handle assembly and appearance. In particular, a handle assembly is provided with an exterior surface that is substantially flush with an outside panel or exterior surface of a power slide door. The handle assembly is preferably operated in a powered mode, yet it maintains a manual open/close operation of the slide door when necessary. For example, the slide door is intended to be primarily operated in a powered mode, actuated by slightly depressing one of two opposing ends of a pivoting handle to actuate an internal switch, providing a powered open/close function. In case of an emergency or loss of vehicle power, however, this handle assembly design additionally maintains a manual operation mode. To operate the manual mode, a user further depresses the one of two opposing ends an additional distance that releases a locking mechanism, exposes the other of the two ends of the pivoting handle to provide a grip, and enables a manual mode of operation to open/close the slide door using the grip.

Figure 1:
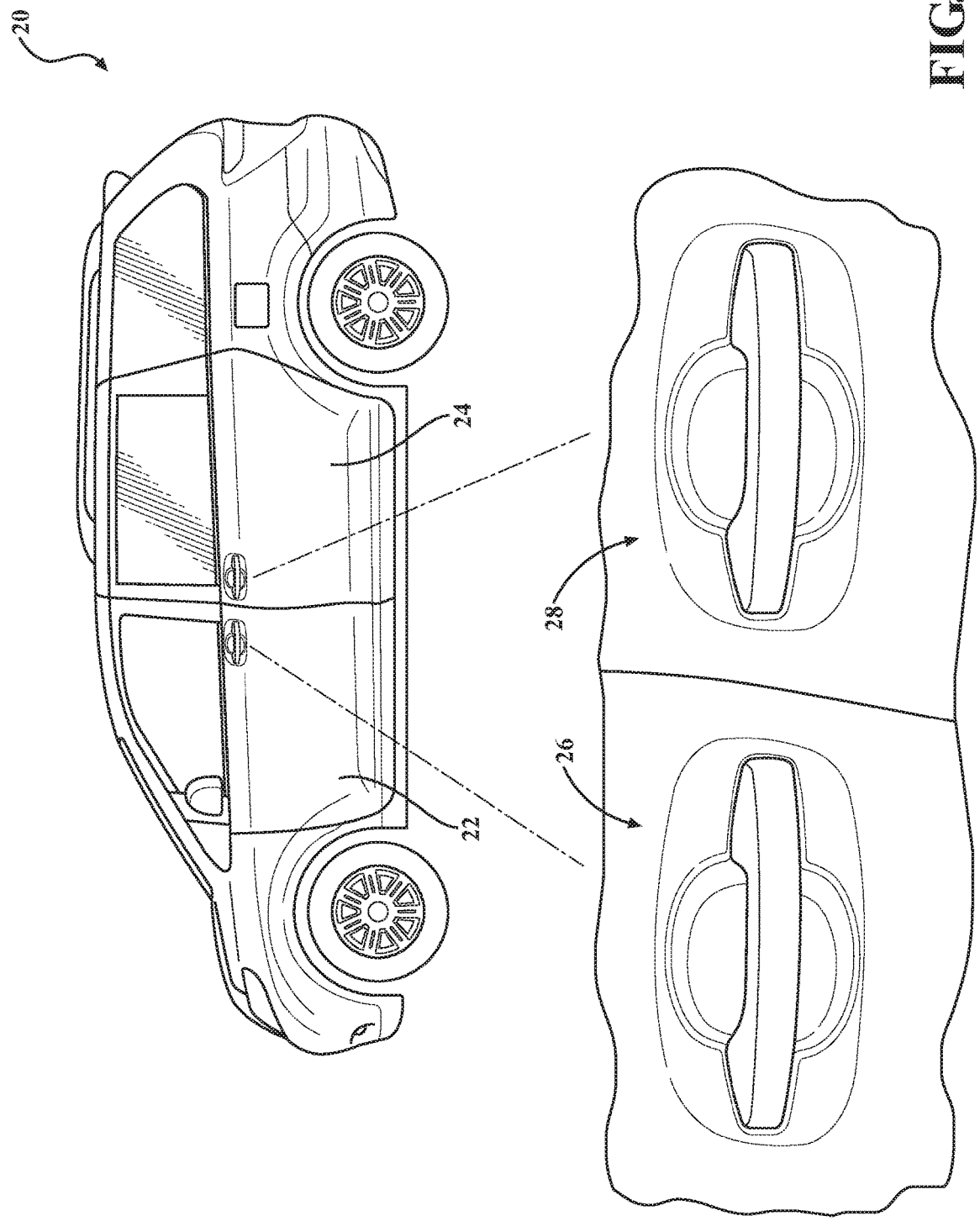
FIG. 1 is a side plan view of a mini-van styled vehicle having a prior art grip type door handle for both a front pivoting door and a rear slide door.
Figure 2:
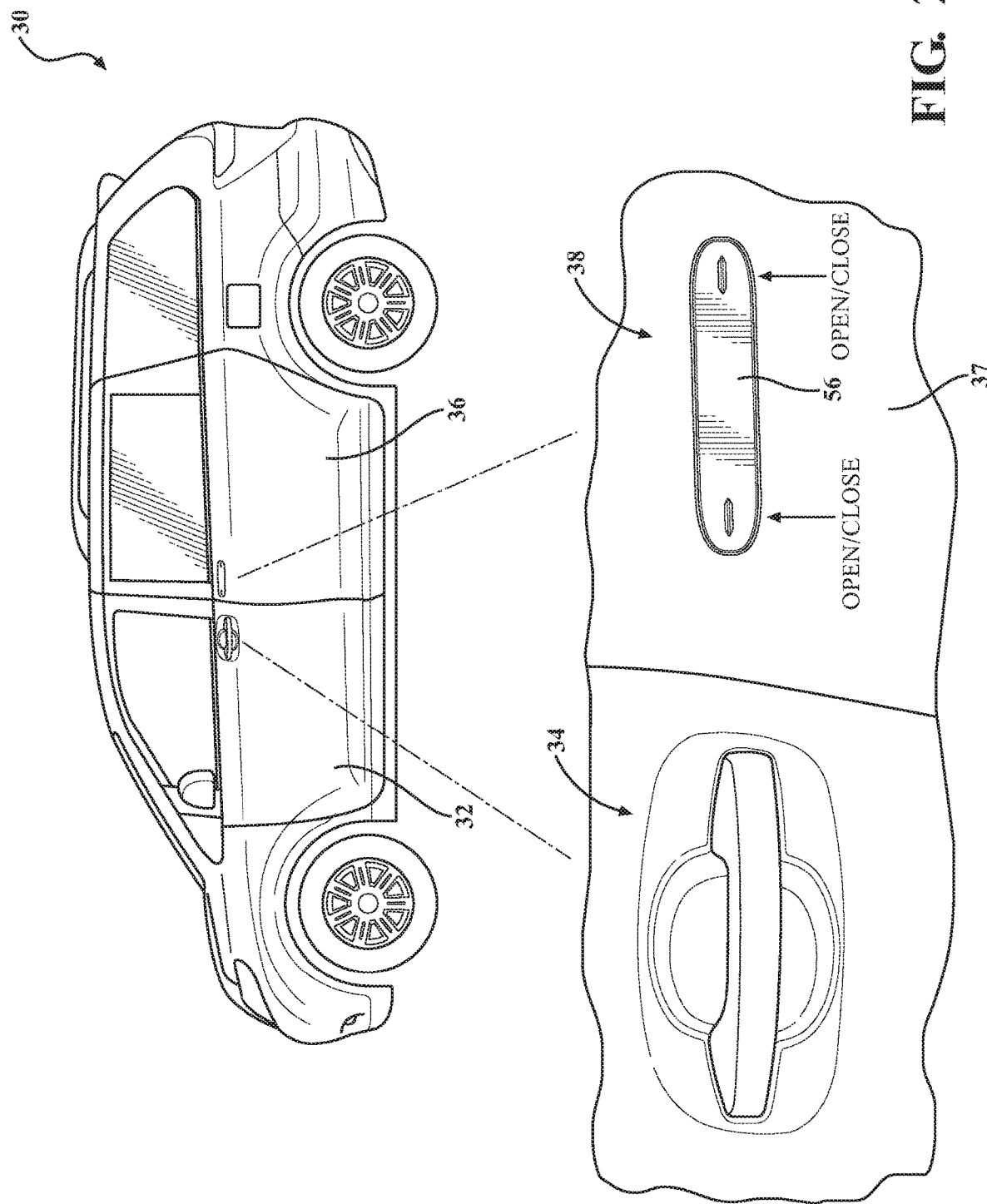
FIG. 2 is a side plan view of a mini-van styled vehicle having a flush mounted type door handle for operating the rear slide door according to the present teachings.

FIG. 1 is a side plan view of a mini-van styled vehicle 20 with a pivoting front door 22 and a sliding rear door 24, with each door having a prior art grip-type door handle 26, 28. FIG. 2 is a side plan view of a mini-van styled vehicle 30 with a pivoting front door 32 having a similar grip type door handle 34, and a sliding rear door 36 having a flush mounted type door handle 38 according to the present teachings. The present design provides appealing aesthetics and eliminates the manual "grip" type handle extending from the typical sliding vehicle door when the handle is not in use. In particular, the door handle assembly is mounted inside of a case, or housing, that is attached to and integrated within the power slide door ("PSD") body.

Figure 3:
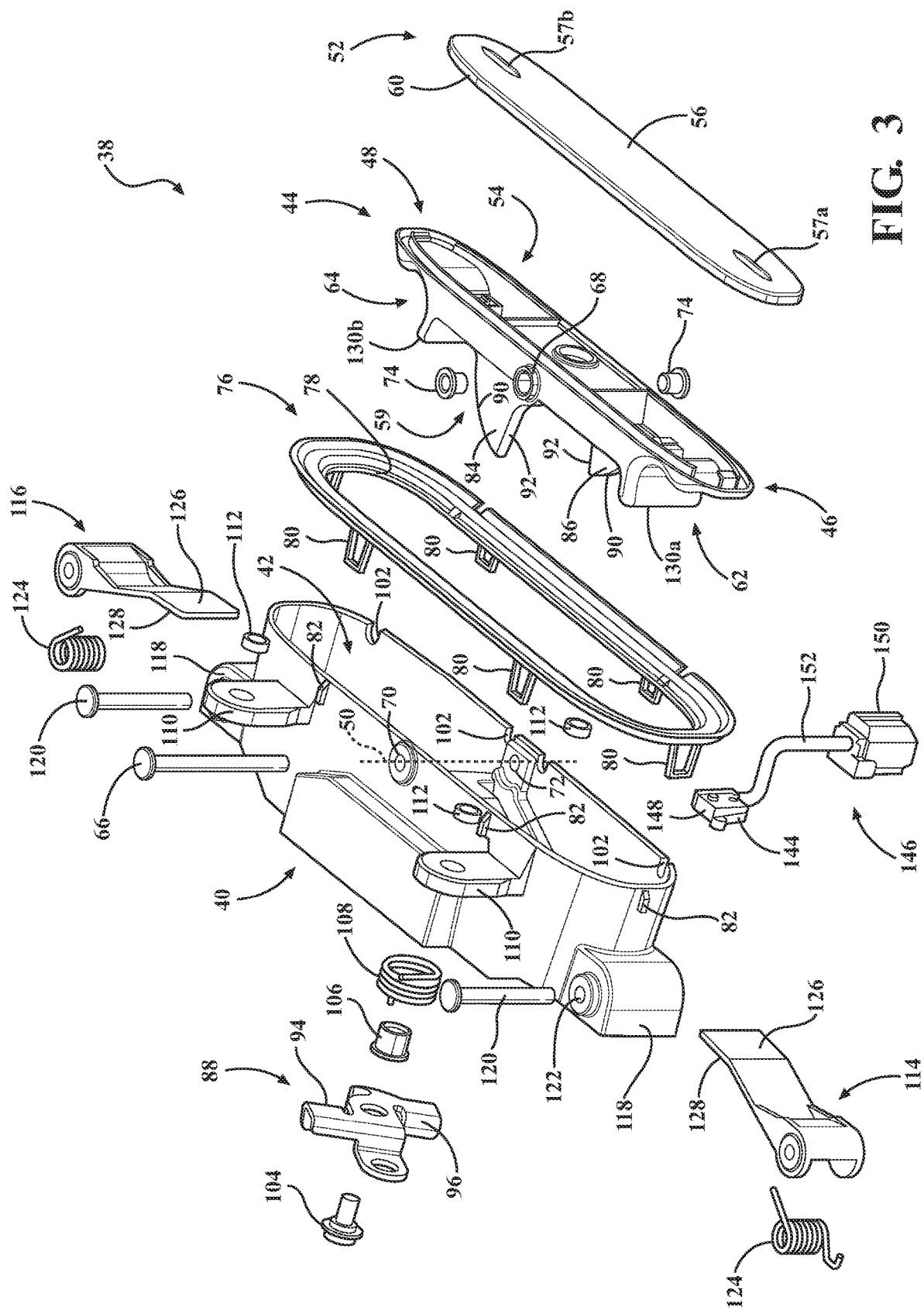
FIG. 3 is an exploded perspective view illustrating various details of the flush mounted handle system according to the present disclosure.

FIG. 3 is an exploded perspective view illustrating various details of the flush mounted handle assembly 38 according to the present disclosure. In various aspects, a case 40 is provided, configured to be attached to or fixed with a power slide door 36, for example, disposed in a recess of an exterior panel 37 of the slide door 36. The case 40 may define an internal cavity 42 having a size and shape configured to house various components of the handle assembly 38. A handle base 44 is provided with first and second opposing ends 46, 48. The handle base 44 may be pivotally coupled to the case 40 for pivotal, or see-saw, movement of the handle base 44 at a fixed pivot axis 50 with respect to the case 40.

Figure 8:
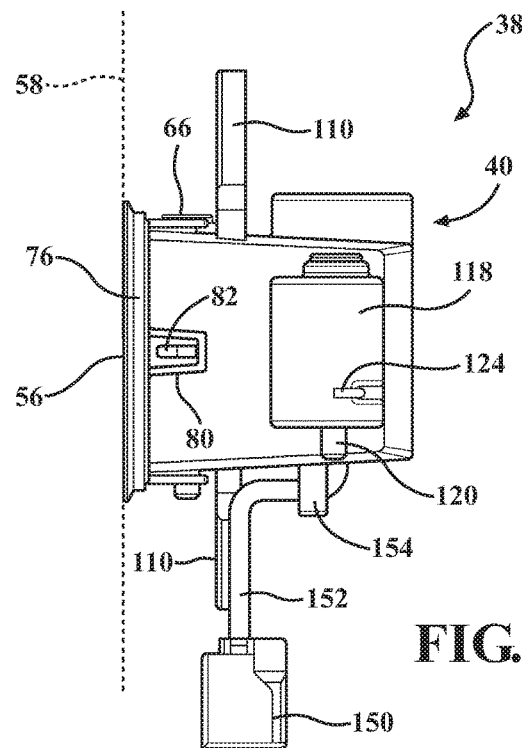
FIG. 8 is a side plan view illustrating the assembled flush mounted handle as shown in FIG. 3.

The handle base 44 may be hollow and may include a cover plate 52, or the like, to define a front face (i.e., exterior facing side) 54 that may be substantially planar, located in a front plane 58, or otherwise referred to as a resting plane, as shown in FIG. 8. The cover plate 52 may define an oval shaped perimeter 60. As shown, the cover plate 52 may be provided as a separate component, coupled to the front face 54 of the handle base 44 and configured to define an exterior surface 56. In other aspects, the cover may be integrally formed with the handle base 44. The cover 52 may include one or more surface features 57a, 57b that indicate where the handle should be pressed for actuation. The surface features 57a, 57b may be extensions or recesses, and may be unique or different from one another to indicate a functionality of operation. A rear face (i.e., internal facing side) 59 of the handle base 44 may be shaped or contoured. For example, the respective grip areas 62, 64 near the first and second opposing ends 46, 48, may be provided with a curved or scalloped portion that can be configured for use as a gripping surface to grab and move the power slide door in a manual power mode, as will be discussed in more detail below. In various aspects, in an assembled state and in a rest position, the exterior surface 56 of the handle assembly 38, which in most instances is the cover 52, may be substantially aligned with, or flush with, an exterior surface 37, or panel, of the power slide door 36.

In the non-limiting example shown, an axle pin 66, or similar fastener, may be provided through a bore 68 defined in a center region of the handle base 44. As shown, the axle pin 66 is placed through respective upper and lower apertures 70, 72 located in a center area (along the length direction) of the case 40. Appropriate bushings 74 may be also provided. A seal or pad 76 may be provided, for attachment to the case 40. The seal 76 may define an inner diameter 78 commensurate with a shape of the handle base 44 and cover 52. As shown, a plurality of cooperating retention features 80 and angled protrusions/ribs 82 may be disposed about a perimeter of the pad 76 and the case 40.

The handle base 44 may define first and second drive arms 84, 86 to actuate rotational movement of a bell crank 88. As shown, the drive arms 84, 86 may be independent from one another and, in one example, may extend a distance from the rear face 59 of the handle base 44 in a direction perpendicular to the front plane 58. As shown each drive arm 84, 86 may define an arcuate shaped portion 90 and a substantially linear shaped portion 92 that can be used to engage respective arms 94, 96 of the bell crank 88. A rear wall 98 of the case 40 may be provided with respective apertures 100 (FIG. 9) defined therein through which the drive arms 84, 86 pass through to engage the bell crank 88. The case 40 may also be provided with a plurality of spaced-apart drain holes 102 to allow water or liquids to pass through the handle assembly. The case 40 may include various attachment flanges 110 for securing the case 40 to the power slide door 36 with fasteners and collars 112.

The bell crank 88 may be coupled to an exterior of the case 40, for example, using a bolt 104 and weld nut 106, or other suitable fastening mechanism, at the center of the rear wall 98. A biasing member 108 may be provided, such as a spring, located between the case 40 and the bell crank 88 in order to urge rotation of the bell crank 88 in a self-centering rest position. In the exemplary bell crank 88 shown, two lever arms 94, 96 are provided having an angle of separation of about 180 degrees.

In various aspects, the assembly 38 may be provided with a pair of paddles 114, 116 configured to bias the handle base 44 in a self-centering, rest position. The paddles 114, 116 can be provided as counterweights to prevent unwanted movement of the handle base 44, which may be especially useful when the handle assembly 38 is subjected to certain forces, such as the forces involved during a vehicle side-impact. As shown, the case 40 may be provided with extending side portions 118 to house the paddles 114, 116 and provide each paddle with a separate pivot axis. Paddle axle pins 120 may be aligned with respective apertures 122 defined in the side portions 118 to secure the paddles 114, 116. Biasing members, such as springs 124 may be provided to urge the paddles 114, 116 against respective portions of the rear face 59 of the handle base 44. For example, forward facing engagement surfaces 126 of the paddles 114, 116 may contact extending end portions 130a, 130b of the handle base 44, urging the handle to a centered, rest position.

With renewed reference to FIG. 2, when it is desired to activate the power slide door 36 (in a powered/automatic mode), a user simply needs to inwardly press an end 46, 48 of the handle, as identified by the arrows labeled "Open/Close," a first distance. In various aspects, pressing either end 46, 48 will initiate the appropriate opening or closing function because the request may be sent to a controller with suitable logic to determine the current operational status of the power slide door and coordinate the subsequent opening or closing operation. As will be discussed in more detail below, the inward depression of either end 46, 48 of the handle 44 a first depressed position will cause one of the drive arms 84, 86 of the handle base 44 to engage a respective arm 94, 96 of the bell crank 88. The bell crank 88 will rotate in a first direction which, in turn, provides for the actuation of a switch sub-assembly 146 that engages operation of a motor (not shown) to activate the power slide door 36 and slidably move the door into the desired open or closed position. In various aspects, once the handle is inwardly pushed to the appropriate first distance, to the first depressed position, the handle assembly 38 may be configured to provide at least one of an audible or visual notification to a user, such as a tone or beep/sound, in order to indicate to the user when the power slide door has been activated. In certain aspects, there may be a visual indication, such as an LED light or the like, notifying the user of the activation. Additionally or alternatively, the handle assembly 38 may be provided with the ability to provide haptic feedback. In still other aspects, the user may additionally feel an increased level of push-back or resistance from the spring 124 or other stop means.

Once a user releases the end 46, 48 of the door handle, whether it is the handle base 44 or the cover 52 attached thereto, the handle base 44 may then be automatically biased back to a centered, or rest position. For example, the biasing member 108 urges the rotation of the bell crank 88 in a direction opposite that of the rotation previously caused by the engagement with the drive arm 84, 86. At the same time, one or more biasing member 124 coupled with the respective side paddle 114, 116 urges the paddle 114, 116 back a rest position, which, in turn, moves the handle base 44 to a centered, rest position where the exterior surface 56 of the handle assembly 38 is substantially flush with an exterior surface 37 of the power slide door 36.

Figure 4A:
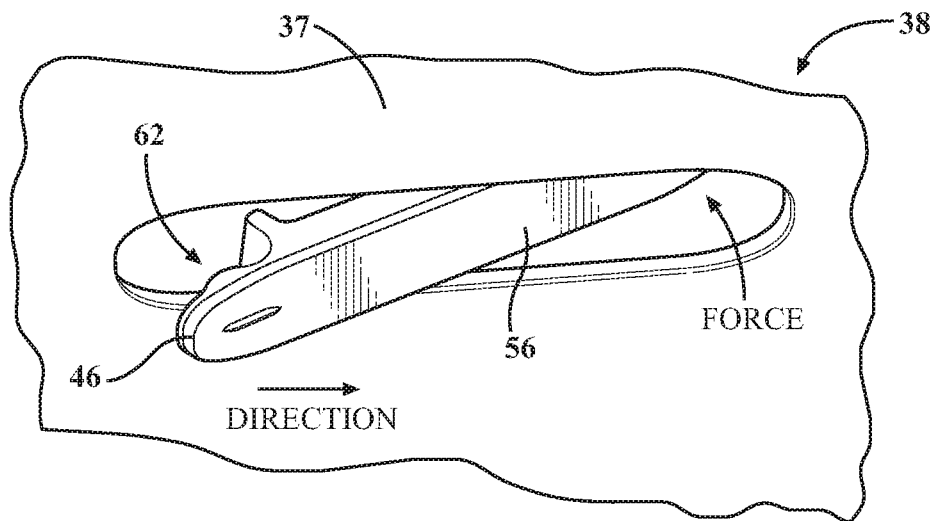
FIG. 4A is a first schematic view illustrating the operation of the flush mounted door handle according to a first aspect with a pivoting grab bar handle.
Figure 4B:
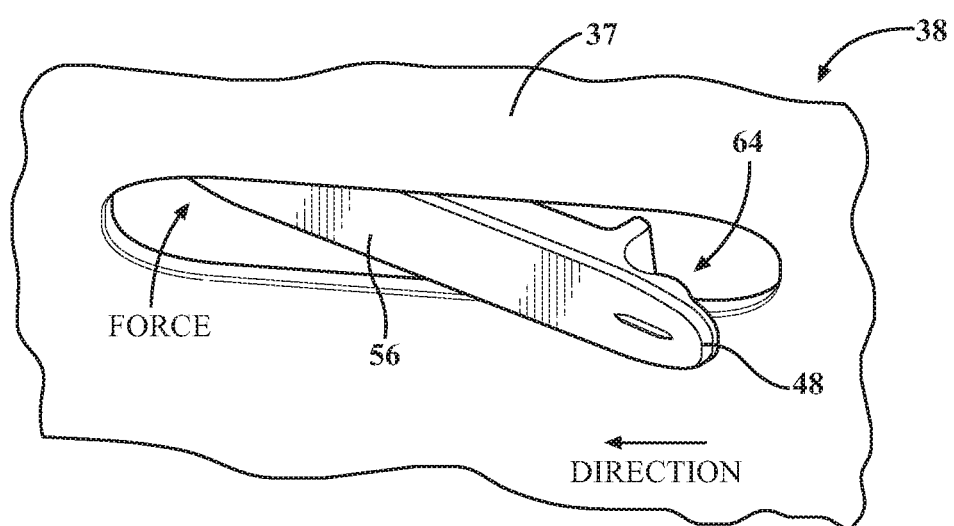
FIG. 4B is a second schematic view illustrating the operation of the flush mounted door handle according to the first aspect with a pivoting grab bar handle.

One of the many features of the present technology is that the handle assembly is also configured to provide a manual mode of operation, for example, when the power source is depleted or not available, or in certain emergency modes when it may not be feasible or desirable to operate in a power mode. FIGS. 4A and 4B are schematic views illustrating the operation of the flush mounted door handle assembly 38 in the manual operation mode with a pivoting grab bar handle base 44. In order to operate the handle assembly 38 in a manual mode, a user will first similarly engage a respective end 46, 48 of the door handle 44, or cover 52. However, instead of lightly depressing the desired end 46, 48 (selected based on the desired directional movement) of the handle base 44, the end 46, 48 is depressed to a second depressed position, which is inward a further distance than the first position. For example, in various aspects, lightly depressing the handle for operation of the powered mode may include a depression movement of the handle end 46, 48 an inward distance of from about 3 mm to about 10 mm, or about 7 mm. Depressing the handle for operation of the manual mode may include a depression movement of the handle end 46, 48 a distance of from about 18 mm to about 21 mm, or more. Further depressing the handle end 46, 48 this distance will serve to release a locking mechanism, for example, to pull a cable 89 (FIG. 11) or other mechanical coupling that may be configured as a release mechanism, in order to unlock/unlatch the slide door and to operate the slide door in a manual operational mode.

As shown in FIG. 4A, the depression of the right end 48 pivots the handle base 44 and thus the left end 46 is pivoted in an outward extended position. In this extended position, the left end exposes a rear gripping area 62 for a user to grab and pull the door in the right direction, thus opening the door. Once a user releases the gripping area 62 of the door handle, the handle base 44 may then be automatically biased back to a centered, or rest position, as described above. As shown in FIG. 4B, the depression of the left end 46 pivots the handle base 44 and thus the right end 48 is pivoted in an outward extended position. In this extended position, the right end exposes a rear gripping area 64 for a user to grab and pull the door in the left direction, thus closing the door. Again, once a user releases the gripping area 64 of the door handle, the handle base 44 may then be automatically biased back to a centered, or rest position, as described above.

Figure 5A:
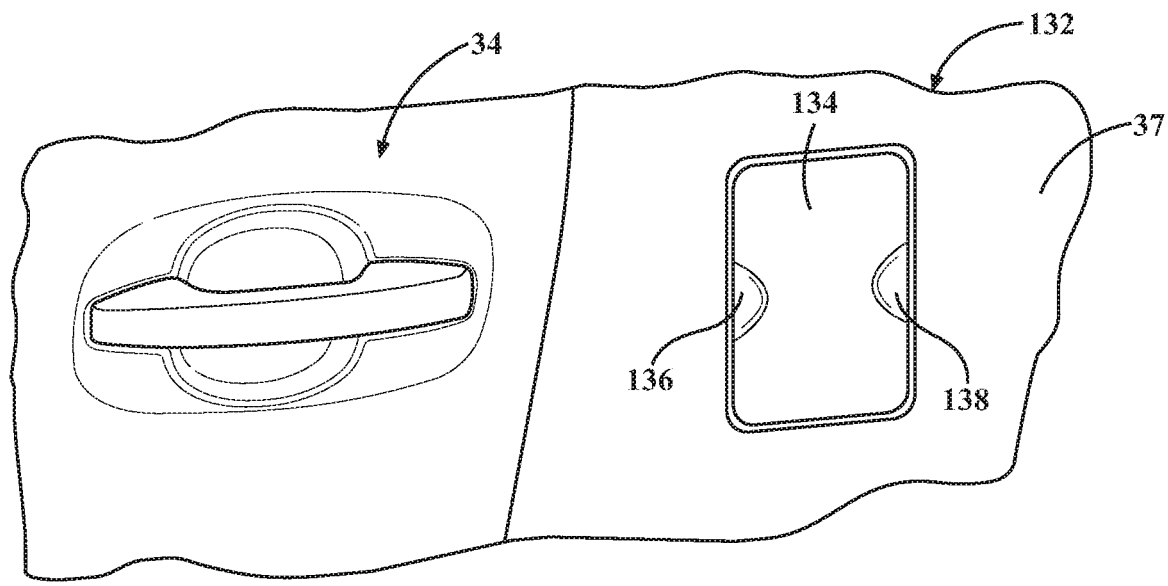
FIG. 5A is a first schematic view illustrating the operation of the flush mounted door handle according to a second aspect with a pivoting plate handle.
Figure 5B:
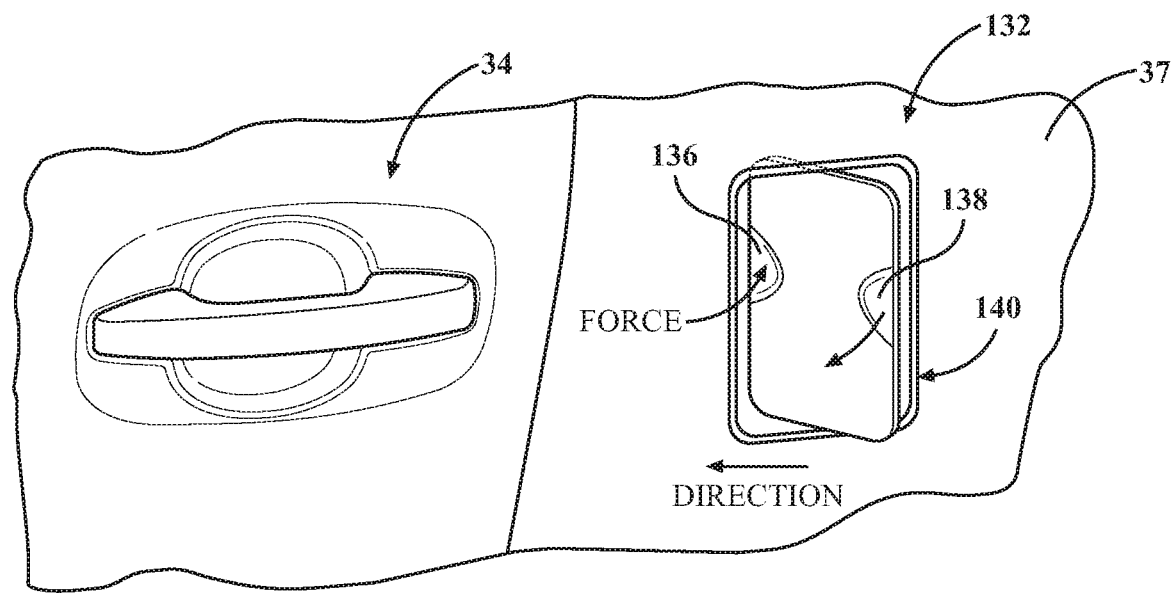
FIG. 5B is a second schematic view illustrating the operation of the flush mounted door handle according to the second aspect with a pivoting plate handle.

FIGS. 5A and 5B are schematic views illustrating the operation of a plate-type flush mounted door handle assembly 132 in a power mode (FIG. 5A) and a manual mode (FIG. 5B) using a pivoting plate handle base 134 according to another aspect of the present technology. The plate handle base 134 rotates about a central pivot axis, similar to the other design. As shown, it is contemplated that the flush handle design can be operated by a single press of a finger, as opposed to having to use one's hand in order to grip and pull open a handle according to the traditional handle designs used in the prior art. No gripping would be required to operate the slide door in the powered mode. As shown in FIG. 5A, the plate base 134 similarly has first and second opposing ends 136, 138 that are similarly configured to be depressed to a first depressed position in order to actuate an automated movement of the power slide door 36 in a power mode. In one non-limiting example, the plate 134 may be provided with similar drive arms, as discussed above, to engage the bell crank 88. As shown in FIG. 5B, when a manual mode is desired, a user may depress a desired end, here the left end 136, to a second depressed position in order to release a locking mechanism, for example, via a release cable 89 (FIG. 11), and expose a rear gripping area 140 for a user to grab and pull the door in the left direction, thus closing the door. Although not shown, opening the door in a manual mode is similarly accomplished by depressing the right end 138, to a second depressed position, exposing an opposite rear gripping end for a user to grab and pull the door in the right direction, thus opening the door.

Figure 6:
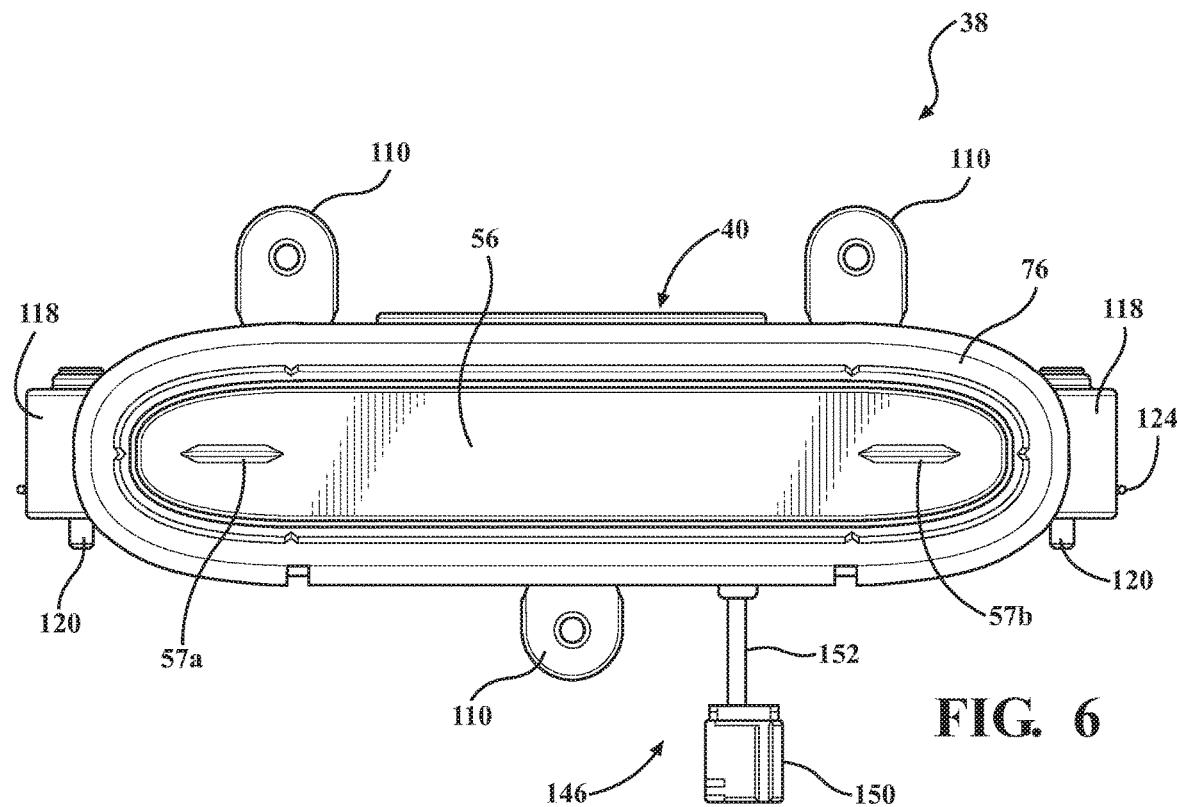
FIG. 6 is a front plan view illustrating the assembled flush mounted handle as shown in FIG. 3.
Figure 7:
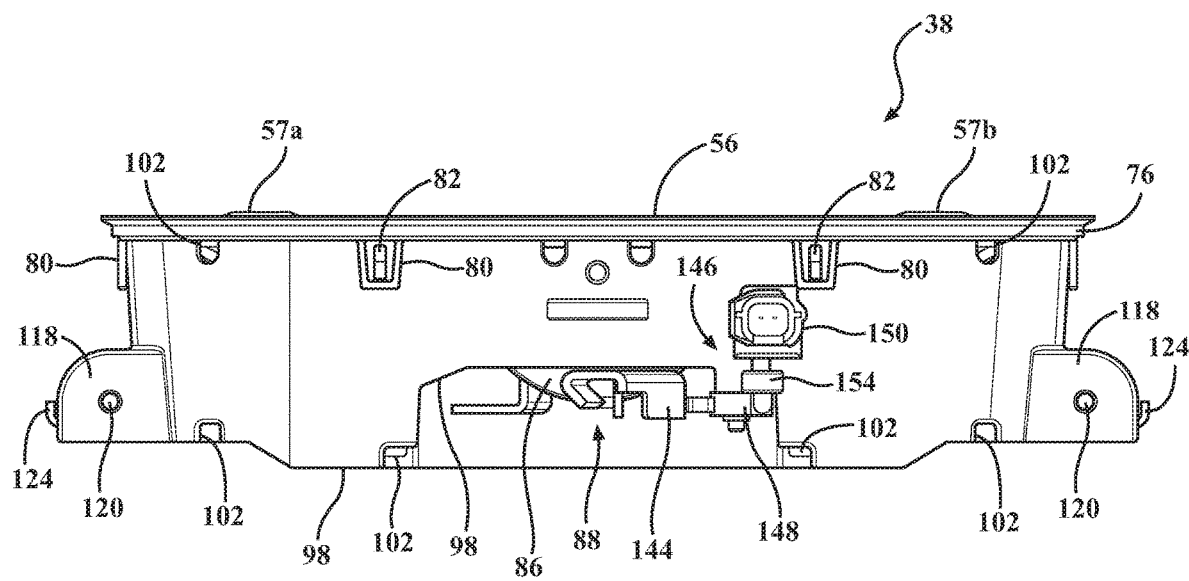
FIG. 7 is a bottom plan view illustrating the assembled flush mounted handle as shown in FIG. 3.

The various features of the handle assembly 38 can further be appreciated with a review of additional drawing views. In this regard, FIG. 6 is a front plan view illustrating the flush mounted handle assembly 38 as shown in FIG. 3 in an assembled state; FIG. 7 is a bottom plan view of the assembly 38; and FIG. 8 is a side plan view of the assembly 38.

Figure 9:
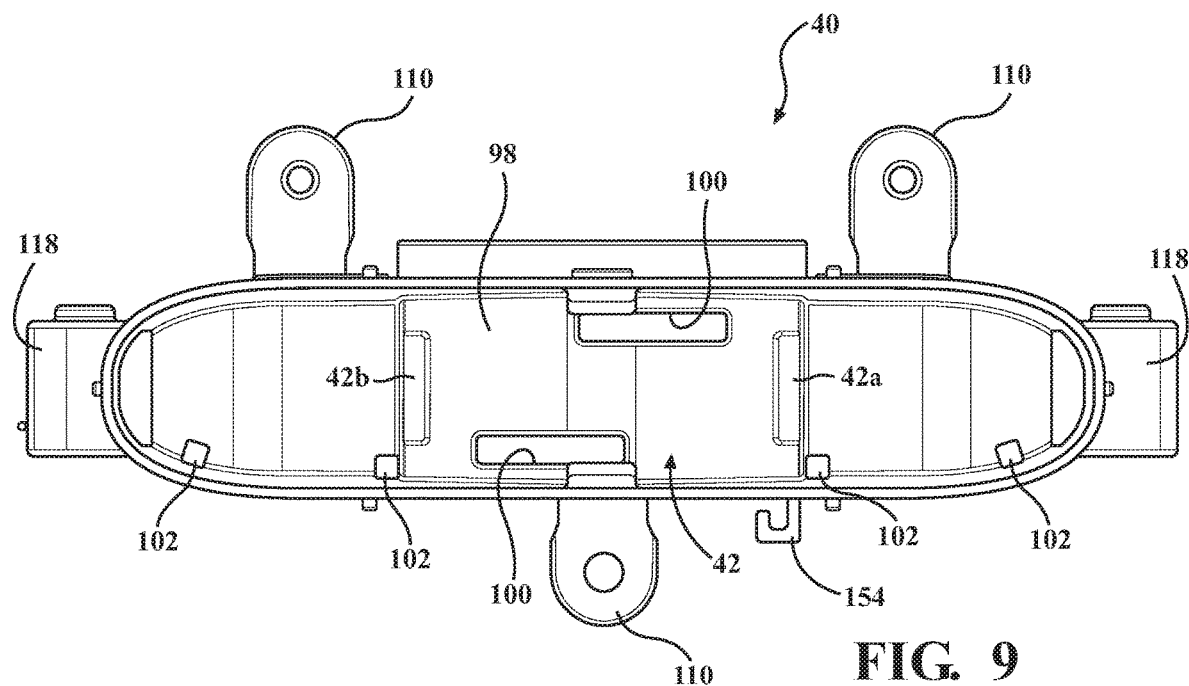
FIG. 9 is a front plan view of an exemplary case defining various access and drain holes.

FIG. 9 is a front plan view of an exemplary case 40 defining an internal cavity 42 and having various openings and access areas, such as respective apertures 100 in the rear wall 98 through which the drive arms 84, 86 pass through to engage the bell crank 88, as well as drain holes 102. It should be understood that the overall design of the case 40 is exemplary in nature, and various changes to the case 40 may be made.

Figure 10:
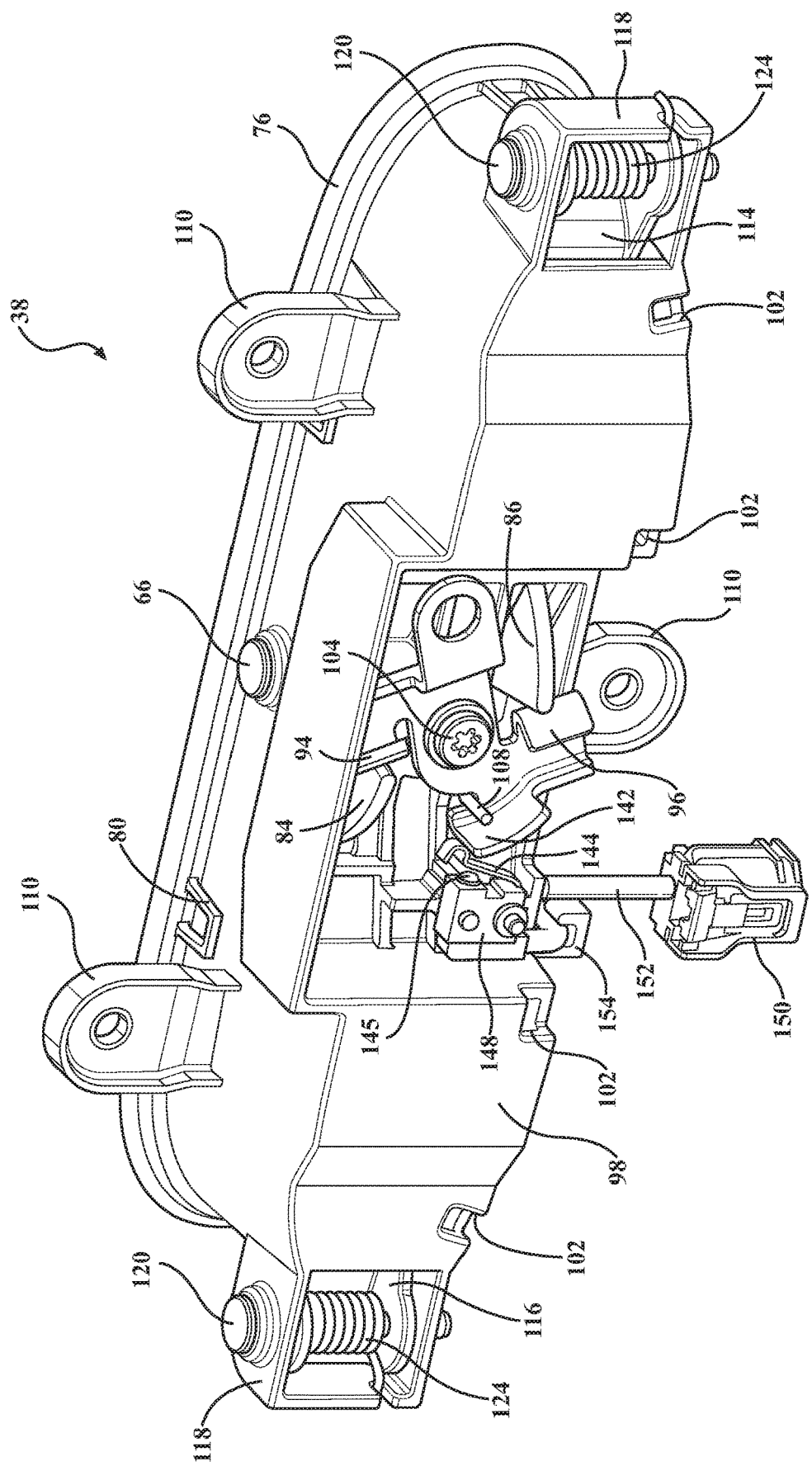
FIG. 10 is a rear perspective view of the assembled flush mounted handle as shown in FIG. 3.
Figure 11:
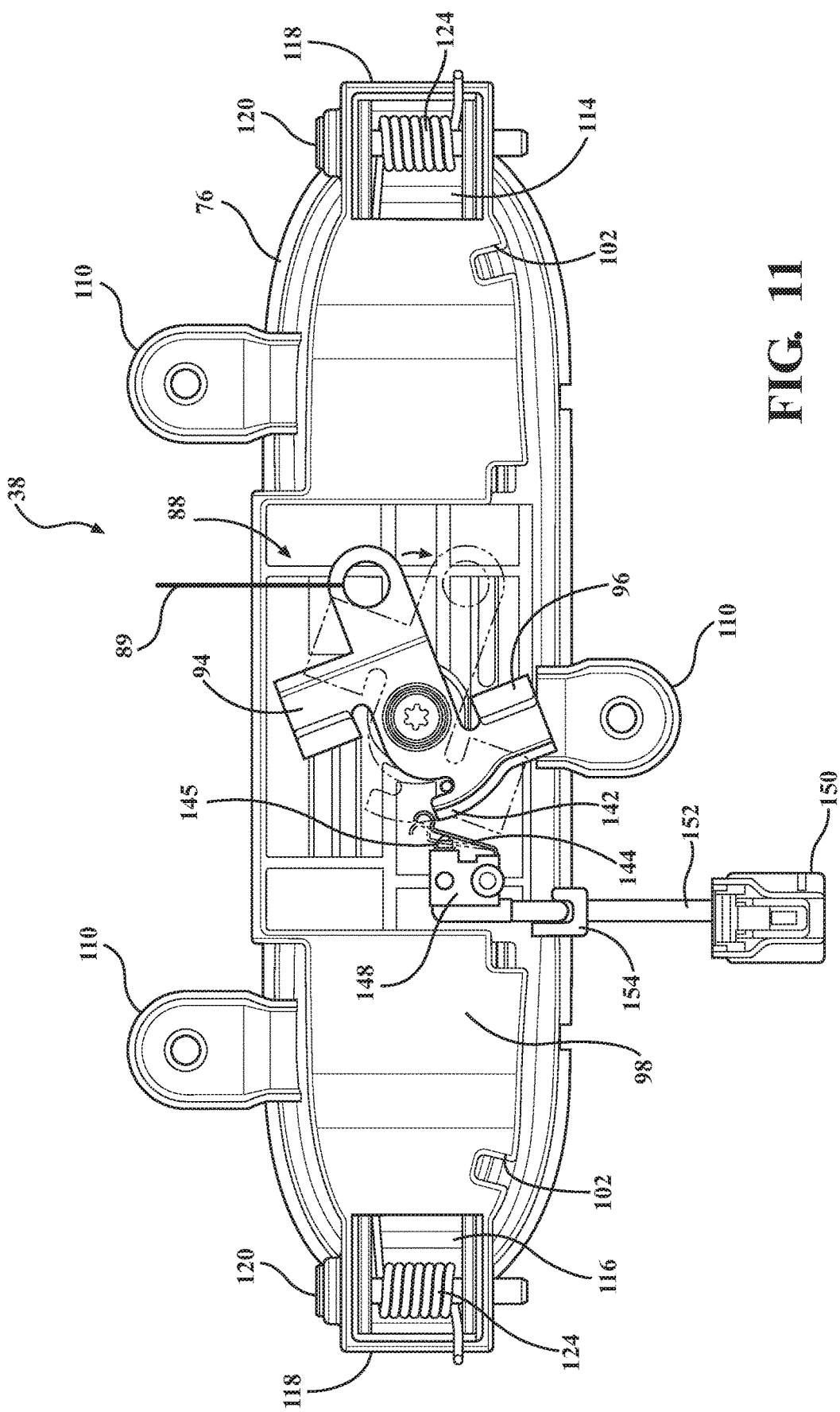
FIG. 11 is a rear plan view of the assembled flush mounted handle illustrating movement of a bell crank between a first position (solid lines) and a second position (dashed lines)

FIG. 10 is a rear perspective view and FIG. 11 is a rear plan view of the assembled flush mounted handle assembly as shown in FIG. 3, both of which provide additional details of the operation of the bell crank 88 and the switch sub-assembly 146. As described above, initially depressing either side 46, 48 of the handle base 44 will cause a pivoting movement of the handle base 44, which, in turn, causes one of the drive arms 84, 86 to make contact with a respective lever arm 94, 96. For example, upon depressing the right side end 48, the upper drive arm 84 contacts the upper lever arm 94, and upon depressing the left side end 46, the lower drive arm 86 contacts the lower lever arm 96. No matter which drive arm 84, 86 engages its respective lever arm 94, 96, the bell crank 88 will rotatably move in the same direction (specifically clockwise when viewed in FIGS. 10-11). FIG. 11 illustrates the bell crank 88 in both the rest position (solid lines) and during the fully depressed position (dashed lines). As can be seen, the clockwise rotation of the bell crank 88 rotates a trigger portion 142 of the bell crank 88 to stroke an internal lever 144 that, in turn, activates a mechanical actuator 145, such as a biased button, of a body portion 148 of the switch sub-assembly 146 for the power slide door to open or close. The clockwise rotation further moves the release cable 89, which may be coupled to a release mechanism as previously discussed. As shown, the internal lever 144 may be hinged or similarly connected to the body portion 148, and include a curved portion or hook at its distal end that ultimately makes contact with the trigger portion 142 in order to send an appropriate signal requesting operation of the power slide door. In one exemplary design, the body portion 148 that houses the mechanical actuator 145 is in electrical contact with a plug-style harness or connector 150 via a suitable wire 152. The wire may be routed using coupling members 154 disposed on the case 40. The switch sub-assembly 146 may be in communication with various logic controllers, processor components, modules, or the like, in order to control the powered operational mode of the slide door, as will be discussed in more detail below with respect to FIG. 18.

Figure 12:
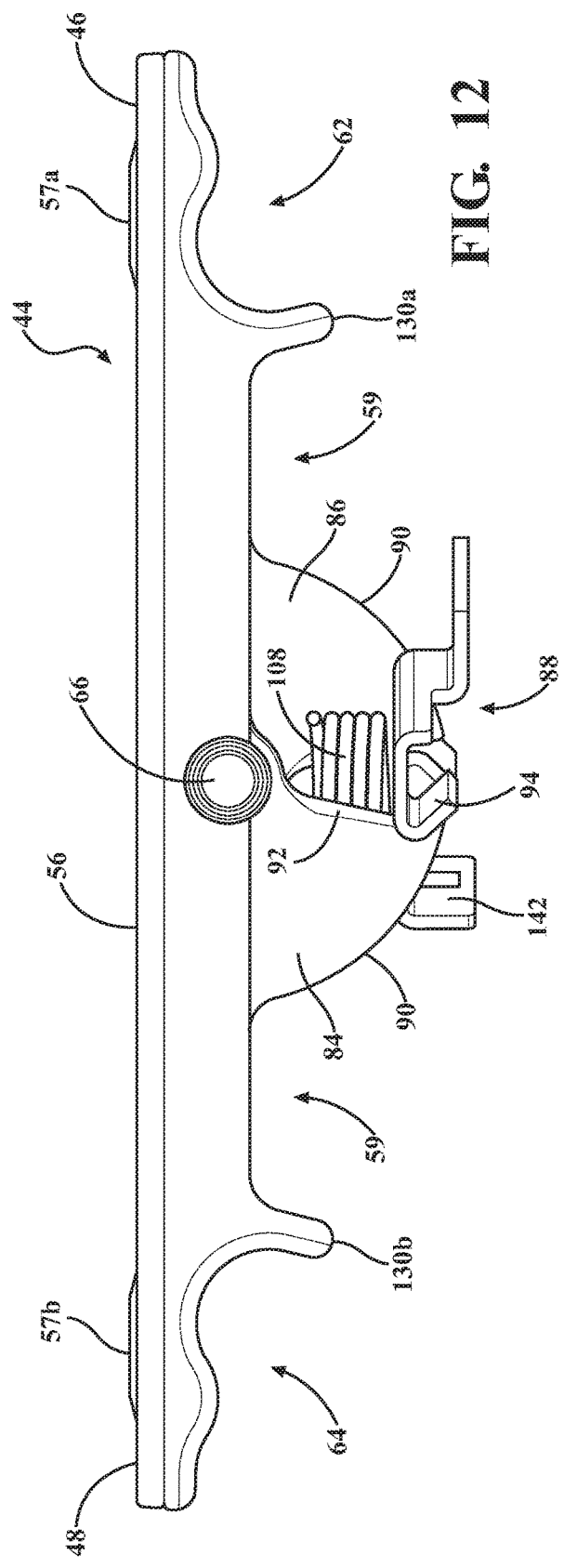
FIG. 12 is a top plan view illustrating an exemplary handle base and bell crank in a centered resting, or neutral state.
Figure 13:
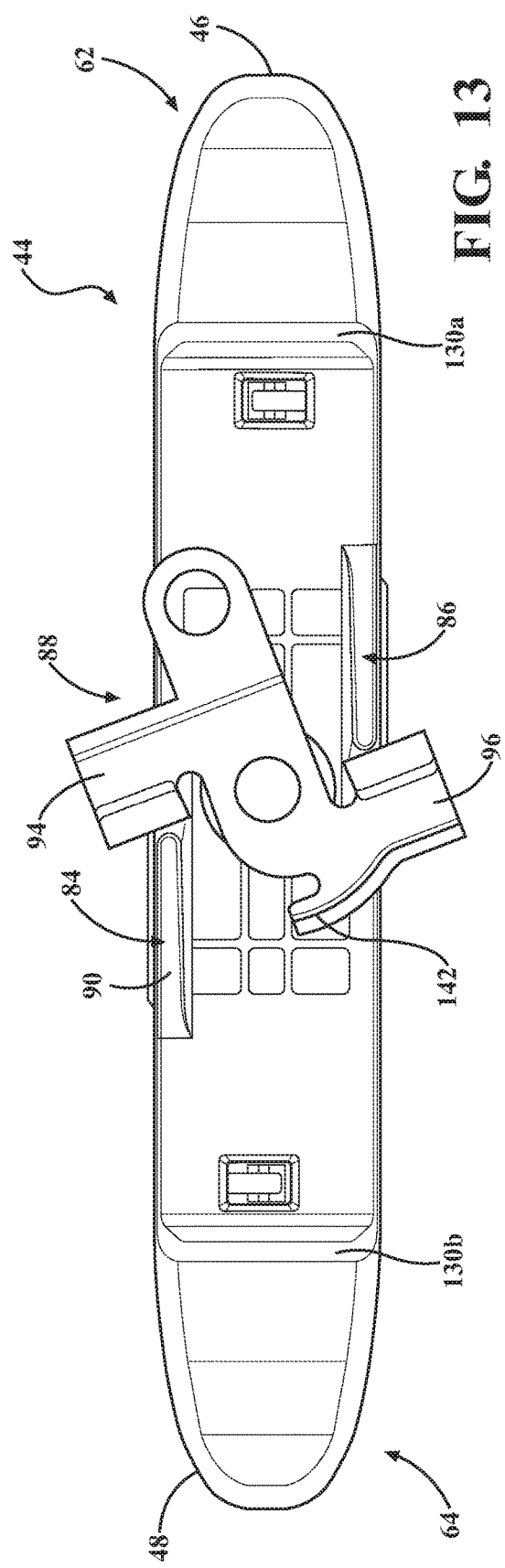
FIG. 13 is a rear plan view illustrating the exemplary handle base and bell crank in the centered resting, or neutral state, as shown in FIG. 12.

FIG. 12 is a top plan view illustrating an exemplary handle base and bell crank in a centered/resting, or neutral state. FIG. 13 is a rear plan view illustrating the exemplary handle base and bell crank in the centered/resting, or neutral state, as shown in FIG. 12. As shown, the lever arms 94, 96 of the bell crank 88 are resting in contact with edges of the respective drive arms 84, 86 extending in a perpendicular direction from a rear face 59 of the handle base 44. In this resting state, the exterior surface 56 of the cover 52 is substantially aligned with the exterior panel 37 of the slide door 36. Although not shown in FIGS. 12-13, but with reference to FIG. 3, when the handle base 44 is located in this centered position, the extending end portions 130a, 130b of the rear facing side of the handle base 44 may also be resting against the forward facing engagement surfaces 126 of the paddles 114, 116, which may be slightly biased thereto.

FIG. 14 is a top plan view illustrating an exemplary handle base and bell crank in a first and fully depressed, actuated state, analogous to that shown in FIG. 4A. FIG. 15 is a rear plan view illustrating the exemplary handle base and bell crank in the first and fully depressed, actuated state, as shown in FIG. 14. As shown, when one end 48 of the handle base is depressed, the handle base 44 pivots and the edge 92 of the upper drive arm 84 engages an edge of the respective lever arm 94 of the bell crank 88 to initiate a rotational movement. Rotation of the bell crank 88 (in the clockwise direction), in turn, causes the trigger portion 142 of the bell crank to contact the internal lever 144 and mechanical actuator 145. In various aspects, further rotation of the bell crank 88 can continue just until the trigger portion 142 eventually approaches, but does not make contact with, the underside of the drive arm 84. At the same time, the extending end portion 130b of the rear facing side of the handle base 44 will be moved against the forward facing engagement surface 126 of the respective paddle 116, and a portion of the rear face 59 of the handle base 44 will eventually contact a respective stop means 42a, 42b (FIG. 9) provided extending a distance from a rear wall 98 of the case. Additionally, the opposing end 46 of the handle base 44 is pivoted in an outward extended position. In this extended position, the opposing end 46 exposes the respective rear gripping area 62 for a user to grab and pull the door in the manual mode, either opening or closing the door. Once a user releases the gripping area 62 of the door handle, the handle base 44 and the bell crank 88 may then be automatically biased back to a centered, or rest position, as shown in FIGS. 12-13.

Figure 16:
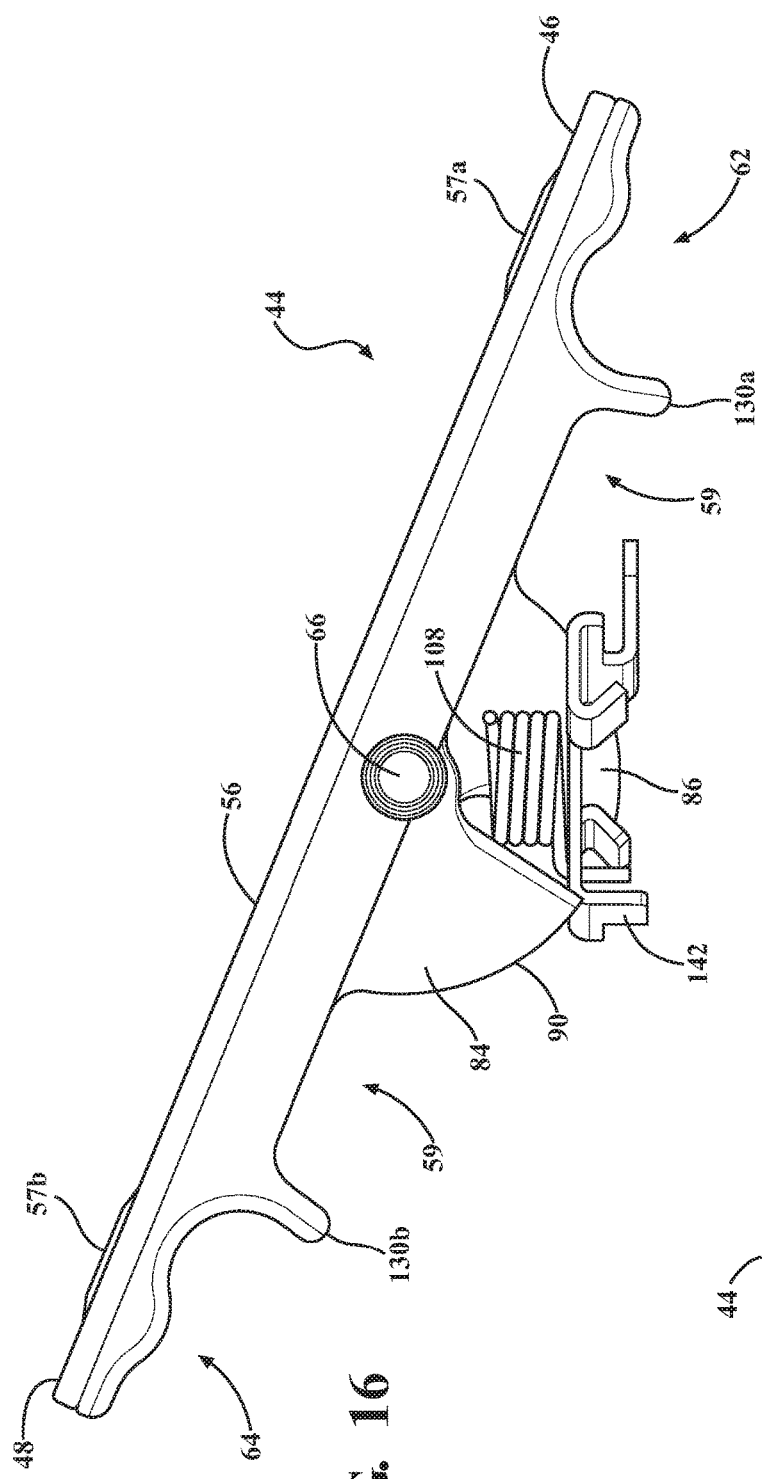
FIG. 16 is a top plan view illustrating an exemplary handle base and bell crank in a second, fully depressed, actuated state.
Figure 17:
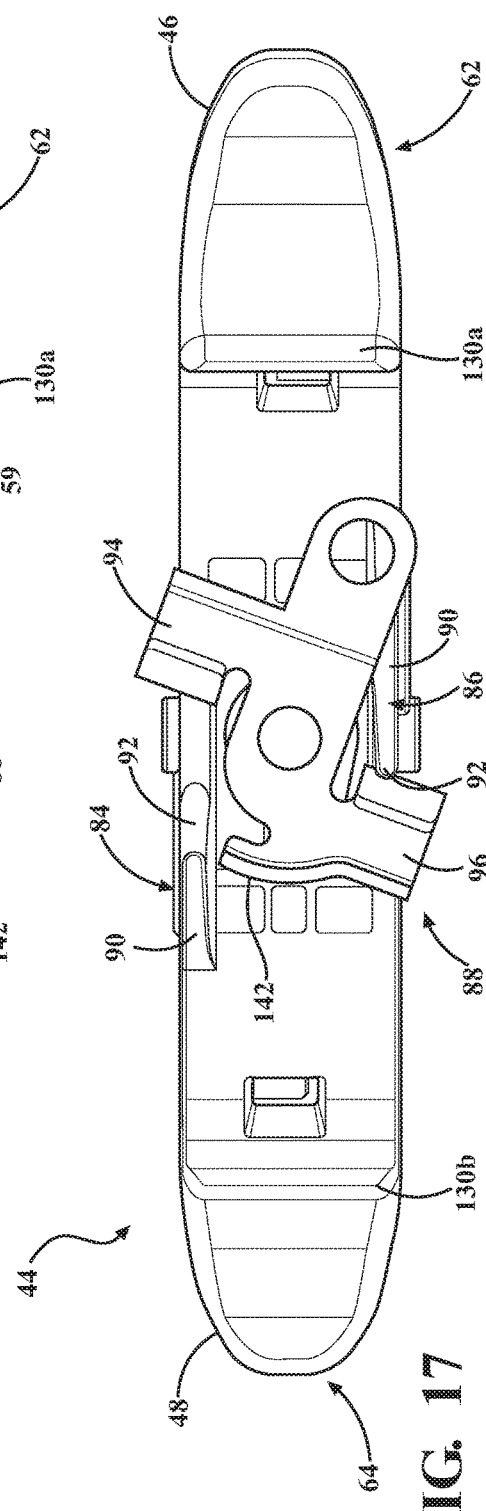
FIG. 17 is a rear plan view illustrating the exemplary handle base and bell crank in the second actuated state, as shown in FIG. 16.

FIG. 16 is a top plan view illustrating an exemplary handle base and bell crank in a second and fully depressed, actuated state, analogous to that shown in FIG. 4B. FIG. 17 is a rear plan view illustrating the exemplary handle base and bell crank in the second and fully depressed actuated state, as shown in FIG. 16. In the reverse arrangement of FIGS. 14-15, when the other end 46 of the handle base is depressed, the handle base 44 pivots and the edge 92 of the lower drive arm 86 engages an edge of the respective lever arm 96 of the bell crank 88 to initiate a rotational movement. Rotation of the bell crank 88 (again, in the same clockwise direction), in turn, causes the trigger portion 142 of the bell crank to contact the internal lever 144 and mechanical actuator 145. In various aspects, further rotation of the bell crank 88 can continue just until the trigger portion 142 eventually approaches, but does not make contact with, the underside of the upper drive arm 84. At the same time, the extending end portion 130a of the rear facing side of the handle base 44 will be moved against the forward facing engagement surface 126 of the respective paddle 114, and a portion of the rear face 59 of the handle base 44 will eventually contact a respective stop means 42a, 42b (FIG. 9) provided extending a distance from the rear wall 98 of the case. Additionally, the opposing end 48 of the handle base 44 is pivoted in an outward extended position. In this extended position, the opposing end 48 exposes the respective rear gripping area 64 for a user to grab and pull the door in the manual mode, either opening or closing the door. Once a user releases the gripping area 64 of the door handle, the handle base 44 and the bell crank 88 may then be automatically biased back to a centered, or rest position, as shown in FIGS. 12-13.

In still other aspects, the present disclosure provides various methods for operating a handle assembly 38 of a power slide door 36 of a vehicle 30. The methods may begin by a user depressing a first end 46, 48 of a pivoting handle 44 inward a first distance into the handle assembly 38, thereby causing a respective drive arm 84, 86 extending from the handle 44 to rotate a bell crank 88. As discussed above, upon rotation of the bell crank 88, an arm 94, 96 of the bell crank may, in turn, actuate a switch sub-assembly 146 configured to send a signal requesting either an opening or closing movement of the power slide door 36. This signal may thereafter be received at one or more control systems of the vehicle.

The control system(s), or portions thereof, may be located within the vehicle, or otherwise made available to the vehicle through a suitable network or through the use of other vehicle systems. The control system(s) may include one or more controller, processor, receiver, transmitter, actuation units, programming units, memory storage, communication units, sub-control units etc., operatively coupled together in a suitable manner, with wired or wireless configurations. In one example, the control system may include an electronic control unit (ECU), or equivalent, preferably located within the vehicle. In some embodiments, the control system may be associated with a user interface, enabling operators to control at least a portion of the system, or to otherwise interact with the system. In certain aspects, the interface may allow a user to enable or disable certain features of the present technology. Further, a user may be able to define or modify certain conditions of the operation of the present technology.

The methods may include releasing the end 46, 48 of the handle, and permitting the bell crank 88 and the handle base 44 to automatically return to a biased centered position. In such a position, an exterior portion 56 of the handle assembly 38 may be flush with an exterior panel 37 of the power slide door 36. The method may additionally include determining a source of power from a power supply has been interrupted, where actuating the switch sub-assembly does not automatically engage either an opening or closing movement of a power slide door 36. The method may then include further depressing the end 46, 48 of the pivoting handle a second distance into the handle assembly 38, to cause additional rotation of the bell crank 88 and to both (1) release a lock mechanism and (2) cause a second, opposite end of the pivoting handle to outwardly extend a further distance from the door. The method may include gripping the outwardly extending second end of the handle 44 to manually move the power slide door 36 to a desired open or closed position.

Figure 18:
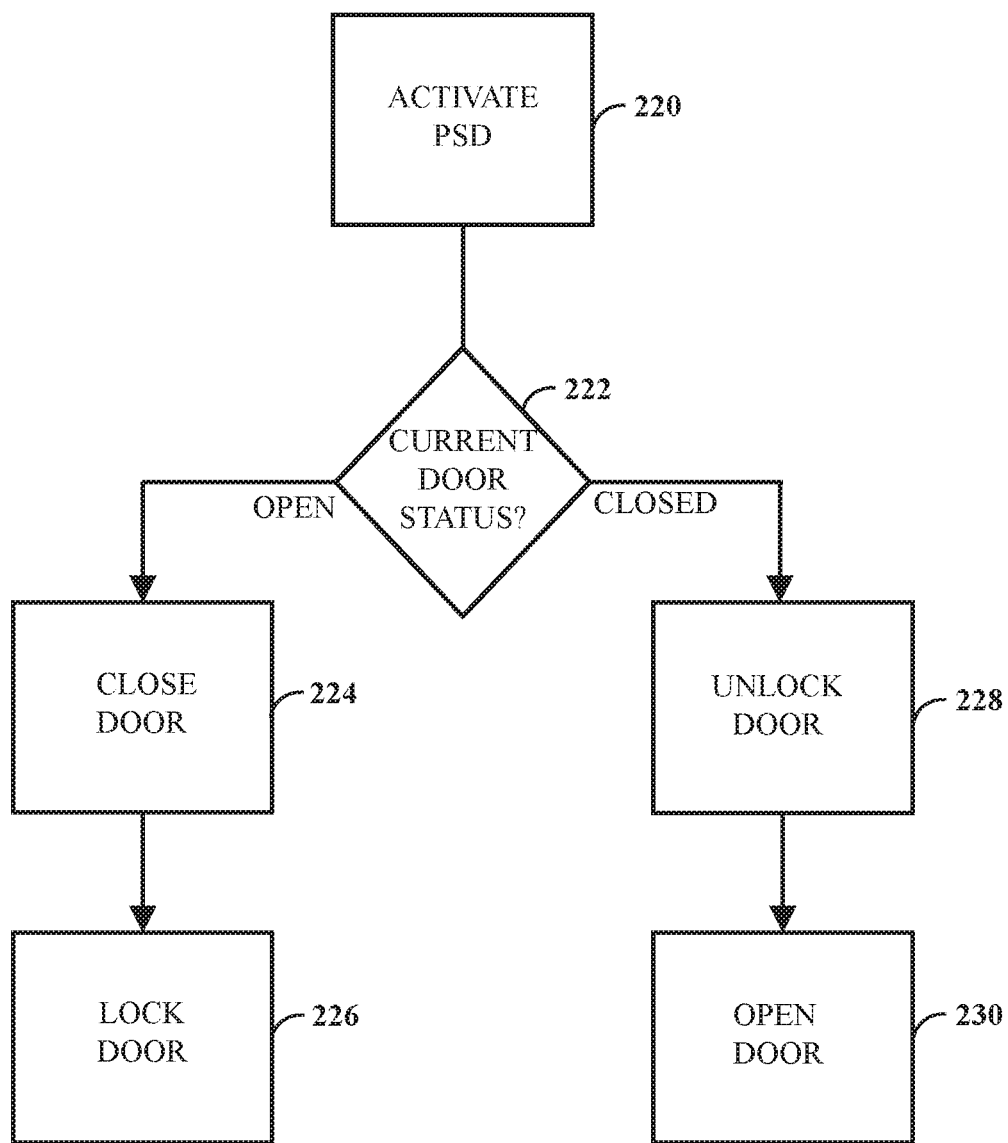
FIG. 18 is a schematic view of exemplary logic control with respect to certain operations of the power slide door.

FIG. 18 is a diagram view illustrating various details of the logic control, and in particular, provides details of the activation of the power slide door 220. For example, as shown by method box 222, the methods may further include determining the current operational state of the power slide door. If the power slide door is in an open position, the ECU may proceed to take the necessary steps to close the door, as represented by method box 224, and optionally lock the door, as represented by method box 226. Alternatively, if the power slide door is in a closed position, the ECU may proceed to take the necessary steps to unlock the door (when necessary), as represented by method box 228, and then open the door, as represented by method box 230.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A flush mounted handle assembly for a vehicle, operable in power and manual modes, the handle assembly comprising:
   a case configured to be fixed in a recess of a power slide door of a vehicle;
   a handle base pivotally coupled to the case, the handle base having a first end and a second opposing end, the first and seconds ends defining respective first and second drive arms extending from the handle base and being configured for a selective pivotal movement in opposite directions about a fixed pivot axis;
   a switch sub-assembly including a mechanical actuator and an internal lever;
   a bell crank coupled to the case and configured to rotate upon engagement with the handle base when the respective first and second ends of the handle base are depressed in order to actuate the switch sub-assembly and to coordinate operational modes of the power slide door,
   wherein rotation of the bell crank initiates a stroke of the internal lever to trigger the mechanical actuator and send a signal for a power mode operation of the power slide door.

2. The flush mounted handle assembly according to claim 1, further comprising a biasing member located between the case and the bell crank, wherein the biasing member urges the bell crank in a self-centering, rest position.

3. The flush mounted handle assembly according to claim 2, wherein the bell crank is configured to rotate between a power mode engagement position, a manual mode engagement position, and return to the rest position.

4. The flush mounted handle assembly according to claim 1, wherein the handle base defines a front plane, and each of the first and second drive arms defines an arcuate shape extending a distance perpendicular to the front plane.

5. The flush mounted handle assembly according to claim 1, wherein first and second drive arms are configured to independently engage respective first and second arms of the bell crank to enable rotation of the bell crank in a single direction.

6. The flush mounted handle assembly according to claim 1, further comprising a pair of opposing paddles configured to bias the handle base in a self-centering, rest position.

7. The flush mounted handle assembly according to claim 1, wherein the first and second ends of the handle base are configured for a pivotal movement between:
   a rest position where an exterior surface of the handle base is substantially flush with an exterior surface of the power slide door;
   a first depressed position with a first level of depression for one of the first and second drive arms to rotate the bell crank and actuate an automated movement of the power slide door; and
   a second depressed position with a second level of depression for the same one of the first and second drive arms to further rotate the bell crank and release a locking mechanism and to permit a manual movement of the power slide door.

8. The flush mounted handle assembly according to claim 1, wherein the first and second ends of the handle base are configured for a pivotal movement between:
   a first extended position with a first level of extension; and
   a second extended position with a second level of extension to allow a user to grip the respective end of the handle base and initiate manual movement of the power slide door.

9. The flush mounted handle assembly according to claim 1, further comprising a cover member coupled to the handle base, wherein the cover member defines an exterior surface that is substantially flush with an exterior surface of the power slide door.

10. The flush mounted handle assembly according to claim 1, wherein the fixed pivot axis is located in a center area of the case.

11. A handle assembly for a vehicle, the handle assembly comprising:
    a case configured to be fixed to a power slide door of the vehicle;
    a bell crank coupled to the case in a biased arrangement and configured to rotate in a first direction to selectively engage power mode and manual mode operations of the power slide door, and to return rotate in a second, opposite direction to a centered rest position; and
    a pivoting handle configured to rotate the bell crank, the pivoting handle comprising a handle base movable about a fixed pivot axis extending through a center the case, the handle base defining first and second drive arms, the first and second drive arms being configured to engage the bell crank when respective first and second opposing ends of the handle base are inwardly depressed,
    wherein the first and second opposing ends of the handle base are configured for a pivotal movement between:
    a rest position where an exterior surface of the handle base is substantially flush with an exterior surface of the power slide door;
    a first depressed position with a first level of depression for one of the first and second drive arms to rotate the bell crank and actuate an automated movement of the power slide door; and
    a second depressed position with a second level of depression for the same one of the first and second drive arms to further rotate the bell crank and release a locking mechanism and to permit a manual movement of the power slide door.

12. The handle assembly according to claim 11, further comprising a pair of weighted paddles configured to bias the handle base in a self-centering, rest position.

13. The handle assembly according to claim 11, further comprising:
    a switch sub-assembly including a mechanical actuator; and
    an internal lever, wherein rotation of the bell crank initiates a stroke of the internal lever to trigger the mechanical actuator and send a signal for a power mode operation of the power slide door.

14. A method for operating a handle assembly of a power slide door of a vehicle, the method comprising:

depressing a first end of a pivoting handle inward a first distance into the handle assembly, thereby causing a drive arm extending from the handle to rotate a bell crank;

upon rotation of the bell crank, actuating a switch sub-assembly configured to automatically engage either an opening or closing movement of the power slide door, wherein actuating the switch sub-assembly comprises initiating, by rotation of the bell crank, a stroke of an internal lever to trigger a mechanical actuator of the switch subassembly; and releasing the first end of the handle, permitting the bell crank and the handle to automatically return to a biased centered position, such that an exterior surface of the pivoting handle is substantially flush with an exterior surface of the power slide door.

15. The method according to claim 14, further comprising:

determining a source of power from a power supply has been interrupted, and actuating the switch sub-assembly does not automatically engage either an opening or closing movement of a power slide door;

further depressing the first end of the pivoting handle a second distance into the handle assembly to cause additional rotation of the bell crank and to both (1) release a lock mechanism and (2) cause a second, opposite end of the pivoting handle to outwardly extend a second distance further extending from the power slide door; and gripping the second end of the pivoting handle to manually move the power slide door to an open or closed position.

16. The method according to claim 14, further comprising providing at least one of an audible or visual notification to a user to indicate that either an opening or closing movement of the power slide door has been activated.

* * * * *